UNITED STATES PATENT OFFICE.

CHARLES FRANK SAMMET AND JASON LESLIE MERRILL, OF WASHINGTON, DISTRICT OF COLUMBIA.

PROCESS FOR TREATING FIBER-YIELDING MATERIALS.

1,016,178.  Specification of Letters Patent.  Patented Jan. 30, 1912.

No Drawing.  Application filed October 27, 1911.  Serial No. 657,193.

(DEDICATED TO THE PUBLIC.)

*To all whom it may concern:*

Be it known that we, CHARLES FRANK SAMMET and JASON LESLIE MERRILL, citizens of the United States of America, and employees of the Department of Agriculture, residing, respectively, in the city of Washington, District of Columbia, (whose post-office addresses are Washington, District of Columbia, respectively,) have invented a new and useful Improvement in Processes for Treating Fiber-Yielding Materials.

This application is made under the act of March 3, 1883, chapter 143 (22 Stat., 625), and the invention herein described and claimed may be used by the Government of the United States or any of its officers or employees in the prosecution of work for the United States, or by any person in the United States, without the payment of any royalty thereon.

Our invention relates to the treatment of fiber yielding materials, such as wood, flax, bagasse, straw, etc.

The object of our invention is to provide a process for treating cellulose containing materials by subjecting them to the action of a chemical or chemicals in a gaseous or vaporous condition or medium at ordinary or elevated temperatures or pressures, thus dispensing with the necessity of subjecting the material to the action of chemicals in a solution as is done by known pressures.

Another essential object accomplished by our process is the shortening of the time required in treating the materials. The time of treatment is reduced due to the more rapid penetration and action of chemicals in gaseous or vaporous state or medium. A further result is attained by the lessening of the smaller volume of liquid required to be heated in this process.

The essential advantage of our process is in the small volume of waste liquor produced. In previous processes, the by-products are removed in the large volume of cooking solution used, while in our process the products are removed by the small volume of liquor resulting from the condensation of the vapors. The small quantity of waste liquor produced makes the disposal or utilization of the same much more feasible.

In practicing our process, the fibrous material is cut into pieces of appropriate size and then placed in a digesting vessel of any modern type of construction. After which operation the material is then subjected to the action of gases or vapors, *i. e.*, sulfur dioxid, ammonia and steam, under any suitable pressure, preferably from 25 lbs. to 125 lbs., and at any suitable temperature, preferably from 125° to 160° C. The temperature and pressure within the digester are regulated and controlled in the usual manner. The gases and vapors are introduced into the digester for action on the material through pipes connected to the digester from tanks where such gases or vapors are under pressure exceeding those maintained in the digester, said latter pressure being obtained by the use of pumps or by liquids or solutions which evolve gases or vapors, such as an ammonium sulfite solution. We employ free ammonia and ammonia sulfite at the same time in carrying out the process herein disclosed.

The concentration of the chemicals in the digester are regulated and maintained by the quantities introduced therein either continually or intermittently during the process. The vapors condensed within the digester and containing part or all of the products from the chemical action on the material treated may be removed therefrom either continuously or at intervals by the aid of a suitable relief valve attached to the digester. After the material has been subjected to the process herein described for such a period that it becomes readily disintegrated by slight mechanical action, the operation is complete, and the material is then in condition to be removed from the digester.

Having thus described our invention, we claim:

1. In a process for segregating fibers or cellulose from fibrous or cellulose containing materials by subjecting the materials to the action of ammonium sulfite, ammonia and steam in a gaseous state, substantially as specified.

2. In a process for segregating fibers or cellulose from fibrous or cellulose containing materials by subjecting the materials to the action of sulfur dioxid, ammonia and steam in a gaseous state, substantially as specified.

3. In a process for segregating fibers or cellulose from fibrous or cellulose containing materials by subjecting the materials to the action under pressure of sulfite dioxid, ammonia and steam in a gaseous state, substantially as specified.

In testimony whereof we affix our signatures in the presence of two subscribed witnesses.

CHARLES FRANK SAMMET.
JASON LESLIE MERRILL.

Witnesses:
C. F. SPEH,
EDWARD O. REED.